Patented Sept. 26, 1944

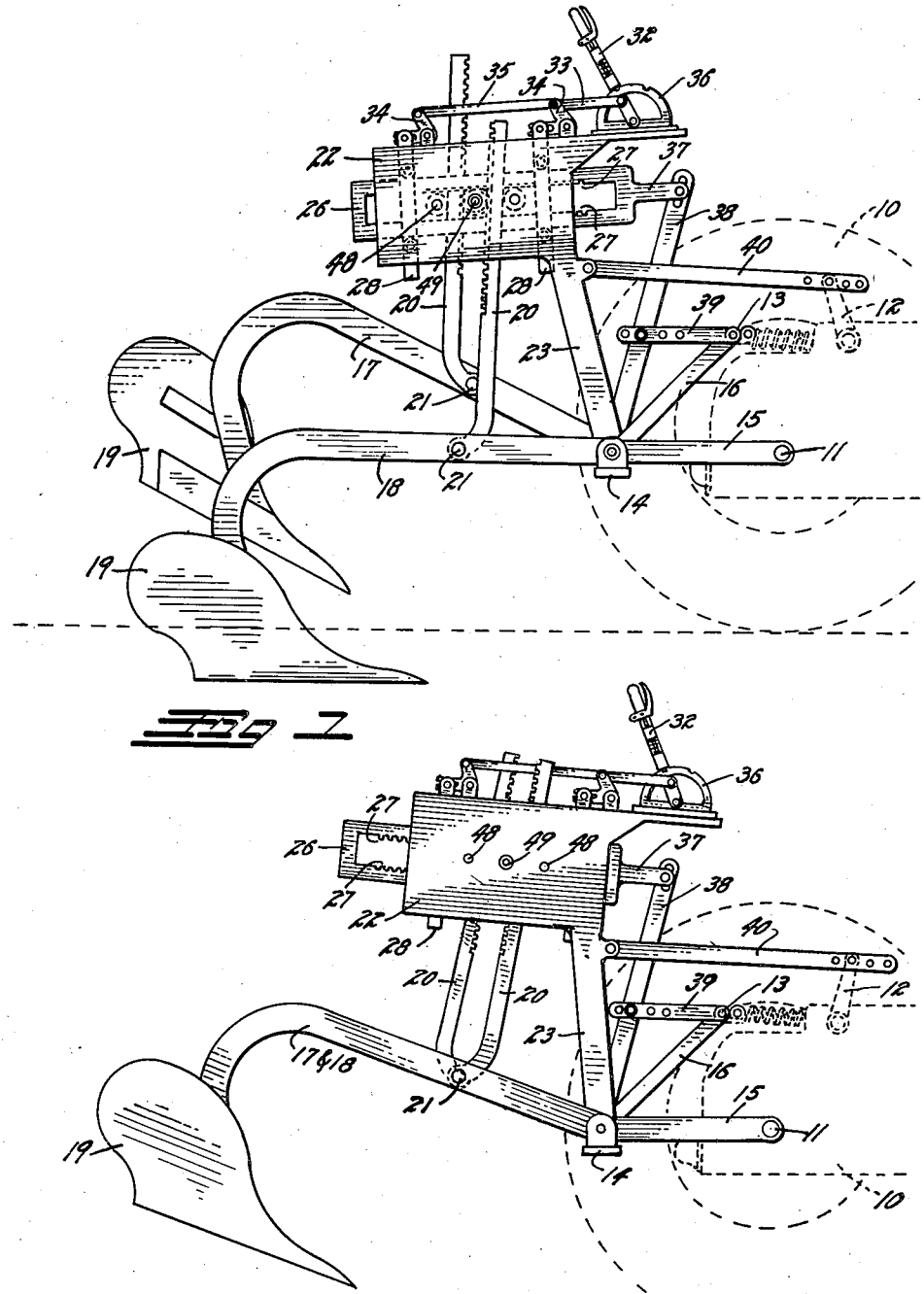

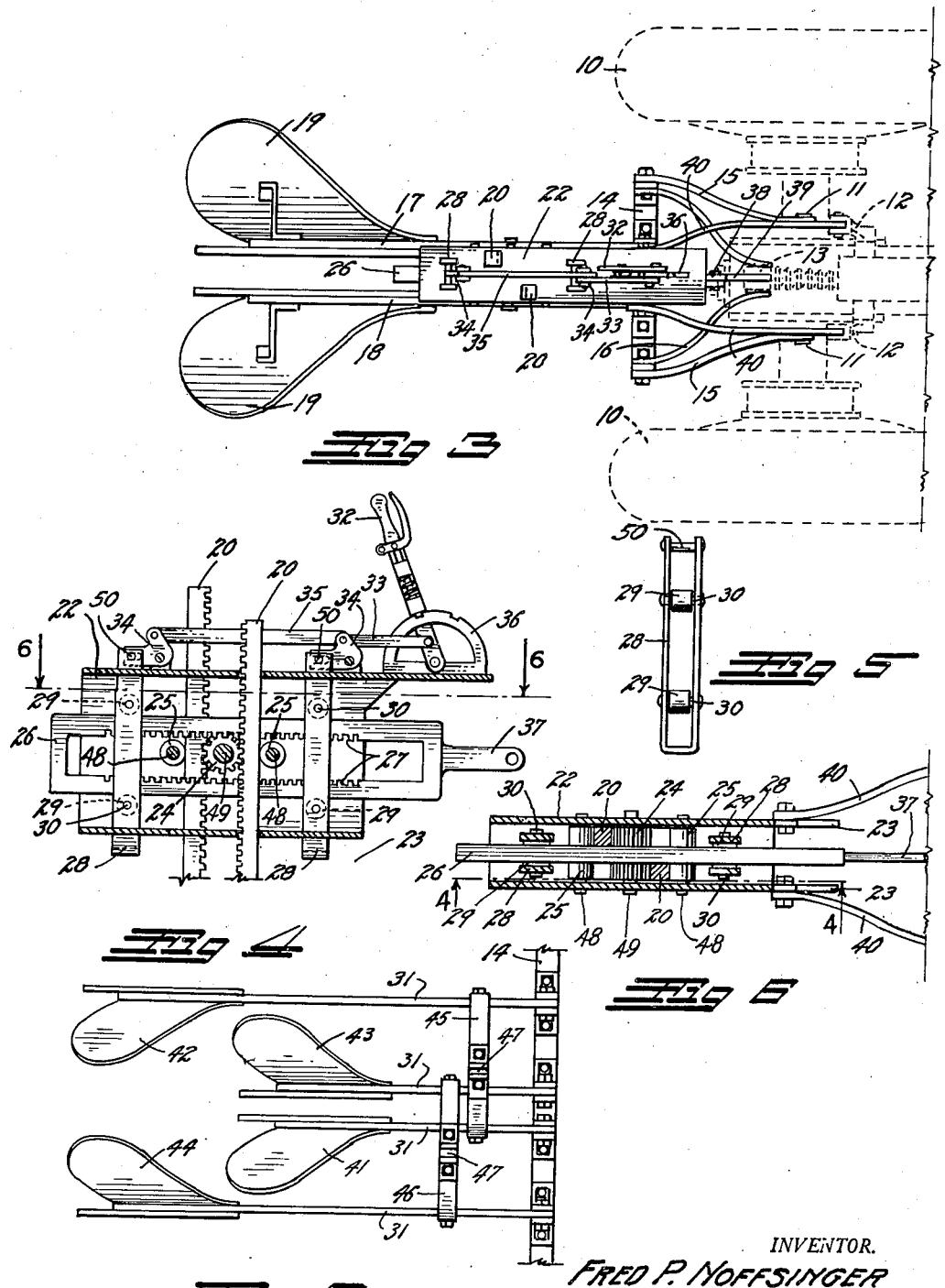

2,358,964

UNITED STATES PATENT OFFICE 2,358,964

PLOW ATTACHMENT FOR TRACTORS

Fred P. Noffsinger, Greeley, Colo., assignor of one-third to Ralph L. Noffsinger and one-third to Robert W. Noffsinger, both of Greeley, Colo.

Application March 16, 1944, Serial No. 526,740

10 Claims. (Cl. 97—47)

This invention relates to a two-way plow attachment for tractors and has for its principal object the provision of a simple and highly efficient device which can be quickly and easily attached to a standard tractor for mounting right and left hand plows thereon and which will employ the standard hydraulic lift of the tractor for raising both plows or either desired one thereof.

Another object of the invention is to provide an arrangement whereby two-way gang plows may be mounted on the tractor without requiring any additional width over the usual two-way single plows.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a side view of the improved two-way plow attachment with the right hand plow in use, illustrating its relation to a standard tractor;

Fig. 2 is a similar view illustrating both plows raised from the ground;

Fig. 3 is a plan view thereof;

Fig. 4 is an enlarged, longitudinal, vertical section, taken on the line 4—4, Fig. 6;

Fig. 5 is a detail view of a rack shifting yoke as employed in the improved attachment;

Fig. 6 is a horizontal section taken on the line 6—6, Fig. 4; and

Fig. 7 is a diagrammatic plan view illustrating a method of mounting two-way gang plows on the attachment.

In the drawings, a typical tractor of the "Ford" type is indicated in broken line at 10, with its draw bar attachment studs at 11, its hydraulic lift levers at 12, and implement thrust connection at 13. The improved attachment is designed to be attached to the draw bar studs 11, the hydraulic lifting levers 12 and the thrust connection 13 of the tractor.

In applying the attachment, a draw bar 14 is attached, by means of draw bar arms 15 to the draw bar studs 11. The draw bar 14 is supported from the thrust connection 13 by means of suitable braces 16. A left-hand plow beam 17 and a right-hand plow beam 18 are pivotally secured at their forward extremities to the draw bar 14 and carry at their rearward extremity any desired type of plow share 19.

The invention is designed to elevate and lower the plow beams 17 and 18. This is accomplished by means of rack bars 20 which are pivotally secured, as shown on 21, to their respective plow beams. The rack bars extend upwardly through a housing 22, which is hingedly supported from the draw bar 14 upon suitable arms 23. The housing rotatably supports a shaft 49 carrying an elongated, toothed pinion 24 and the two rack bars 20 are held in constant mesh with the opposite sides of the pinion 24 by means of guide rollers 25. The guide rollers are carried on roller shafts 48 mounted in the housing 22.

Thus, if the pinion 24 is rotated in one direction, one plow beam will be elevated and the other similarly lowered, and, if rotated in the other direction, the opposite will take place. The pinion is rotated by means of a rack frame 26 which carries two sets of internal rack teeth 27 positioned parallel to each other and on opposite sides of the pinion 24. The sets of teeth 27 are spaced apart, so that when one set of teeth is in mesh with the pinion 24 the other set will be out of mesh therewith.

The rack frame 26 is supported in the housing 22 by means of two yoke members 28, such as shown in detail in Fig. 5. The yoke members carry rollers 29, on suitable roller shafts 30. The rollers 29 ride against the opposite edges of the rack frame 26. The yokes are provided with cross members 50 by means of which they are suspended from suitable rocker members 34 mounted on the housing 22. The yoke members 28 can be simultaneously lifted or lowered by means of a control lever 32. The control lever is connected through the medium of connecting rods 33 and 35 with the rocker members 34.

A locking quadrant 36 is provided, by means of which, the lever 32 can be locked in either of two positions, so that the yokes can be locked with either the upper set or the lower set of rack teeth 27 in mesh with the pinion 24.

The rack frame 26 is provided with a forwardly extending arm 37 which is connected with an upstanding member 38. The member 38 arises from a connection with the draw bar 14 and may be fixedly secured in any desired position by means of a brace 39 extending to the thrust connection 13 of the tractor.

The housing 22 is moveably mounted about the rack bar 26 and the movement thereof is accomplished through the medium of rods 40 which extend to the hydraulic lift levers 12 of the tractor 10. Thus, it can be seen that, when the levers 12 are actuated forwardly, the housing 22 will be pulled forwardly along the rack frame 26 causing the set of internal teeth 27, which is in mesh with the pinion 24, at that time, to rotate the latter.

Let us assume that the right-hand plow beam 18 is lowered, that the left-hand plow beam 17 is elevated, and that the control lever 32 is positioned rearwardly, all as shown in Fig. 1. When the end of furrow is reached, the operator actuates the hydraulic control levers 12 to pull the housing 22 forwardly. This causes the pinion 24, which is in mesh with the upper set of teeth 27, to rotate in counter-clockwise direction. This rotation depresses the left plow beam 17 and elevates the right plow beam 18. At the same time, however, the entire housing 22 is moving forwardly and upwardly so that both plow beams will be simultaneously elevated in addition their individual movements. Therefore, both plows will assume the elevated position of Fig. 2. The tractor is now turned around to start back along the furrow. The operator pulls the control lever 32 forwardly to lift the rack frame 26 so as to bring the lower set of teeth 27 into engagement with the pinion 24. He now actuates the hydraulic left levers 12 rearwardly to force the housing 22 rearwardly along the rack frame 26. This causes the pinion 24 to continue rotation in the counter-clockwise direction so as to further elevate the right-hand beam 18 and lower the left-hand beam 17, while simultaneously lowering both beams, until the left-hand plow share 19 is in engagement with the ground. The beam 18 will now occupy the former vertical position of the beam 17 and, naturally, the former position of the beam 18 will be occupied by the beam 17, so that the plow of the latter can continue back along the furrow.

Adjustment of plowing depth can be accomplished by regulation of the position of the hydraulic lift levers 12. For transportation to and from the field both plows are supported as shown in Fig. 2. As thus far described, the attachment has been applied to single, two-way plows. It can, of course, be adapted to handling two-way gang plows without further change.

In the usual two-way gang plow having four bottoms, the four bottoms are placed side by side so as to require a four plow share width. In this invention, however, the two right-hand plow shares are placed in staggered relation to the left-hand shares so that no greater width is required for four bottoms than is required for a two-bottom two-way.

This arrangement is illustrated in detail in Fig. 7. The various plows are designated by numerals as follows: forward right-hand plow 41; rearward right-hand plow 42; forward left-hand plow 43; rearward left-hand plow 44. Each plow is mounted on an individual plow beam 31 and the plow beams of the two right-hand plows 41 and 42 are connected together by means of an arch member 45 while the beams of the left hand plows 43 and 44 are similarly connected together by means of a cross arch member 46.

It will be noted that the forward right and left hand plows 41 and 43 are positioned immediately ahead of the rearward left and right hand plows 44 and 42, respectively, so that only a two plow width is required.

The cross members 45 and 46 are provided with attachment members 47 by means of which they may be attached to the lower extremities of the rack bars 20 so that both right-hand plows and both left-hand plows will operate as units.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A two-way plow attachment comprising: a right hand plow beam; a left hand plow beam, both plow beams being hingedly mounted at their forward extremities; a toothed rack bar extended upwardly from each plow beam; a toothed pinion in mesh with the teeth of both rack bars; means for rotating said pinion in either desired direction to simultaneously lift one beam while lowering the other; and means for raising and lowering said pinion so as to simultaneously lift both plow beams.

2. A two-way plow attachment comprising: a right hand plow beam; a left hand plow beam, both plow beams being hingedly mounted at their forward extremities; a toothed rack bar extended upwardly from each plow beam; a toothed pinion in mesh with the teeth of both rack bars; a rack frame having two sets of internal teeth positioned parallel to each other and on opposite sides of said pinion; means for bringing either set of teeth in mesh with said pinion; and means for causing relative movement between said rack frame and the axis of said pinion to rotate the latter so as to lift one beam and lower the other.

3. A two-way plow attachment comprising: a right hand plow beam; a left hand plow beam, both plow beams being hingedly mounted at their forward extremities; a toothed rack bar extended upwardly from each plow beam; a toothed pinion in mesh with the teeth of both rack bars; a rack frame having two sets of internal teeth positioned parallel to each other and on opposite sides of said pinion; means for bringing either set of teeth in mesh with said pinion; means for causing relative movement between said rack frame and the axis of said pinion to rotate the latter so as to lift one beam and lower the other; and means for raising and lowering said pinion so as to simultaneously raise and lower both beams when desired.

4. A two-way plow attachment comprising: a right hand plow beam; a left hand plow beam, both plow beams being hingedly mounted at their forward extremities; a toothed rack bar extended upwardly from each plow beam; a toothed pinion in mesh with the teeth of both rack bars; a rack frame having two sets of internal teeth positioned parallel to each other and on opposite sides of said pinion; means for bringing either set of teeth in mesh with said pinion; means for fixedly mounting said rack frame; and means for moving said pinion therealong to rotate the latter.

5. A two-way plow attachment comprising: a right hand plow beam; a left hand plow beam, both plow beams being hingedly mounted at their forward extremities; a toothed rack bar extended upwardly from each plow beam; a toothed pinion in mesh with the teeth of both rack bars; a frame member rotatably supporting said pinion; means for hingedly supporting said frame member; and means for swinging said frame member about the axis of its hinge point to cause said pinion to travel along the teeth of said rack frame.

6. A two-way plow attachment for a tractor, of the type having implement lifting levers actuated by said tractor, comprising: a pair of plow beams; a toothed rack bar extending upwardly from each plow beam; a pinion positioned between and in mesh with both rack bars; and means for rotating said pinion in consequence of the movement of said lifting levers.

7. A two-way plow attachment for a tractor, of the type having implement lifting levers actuated by said tractor, comprising: a pair of plow beams; a toothed rack bar extending upwardly from each plow beam; a pinion positioned between and in mesh with both rack bars; a housing supporting said pinion; a rack frame having two parallel sets of internal teeth movably mounted in said housing, said sets of teeth being positioned on opposite sides of said pinion and being spaced so that only one set can mesh with said pinion at a time; means carried by said housing for placing either desired set of teeth in mesh with said pinion; and means operable from said lifting levers, for causing relative movement between said housing and said rack frame for rotating said pinion.

8. A two-way plow attachment for a tractor, of the type having implement lifting levers actuated by said tractor, comprising: a pair of plow beams; a toothed rack bar extending upwardly from each plow beam; a pinion positioned between and in mesh with both rack bars; a housing supporting said pinion; a rack frame having two parallel sets of internal teeth movably mounted in said housing, said sets of teeth being positioned on opposite sides of said pinion and being spaced so that only one set can mesh with said pinion at a time; means carried by said housing for placing either desired set of teeth in mesh with said pinion; means operable from said lifting levers, for causing relative movement between said housing and said rack frame for rotating said pinion; means for hingedly attaching said housing to said tractor; means for fixedly attaching said rack frame to said tractor; and connecting means between said housing and said lifting levers for moving the former along the rack frame.

9. A two-way plow attachment for a tractor, of the type having implement lifting levers actuated by said tractor, comprising: a pair of plow beams; a toothed rack bar extending upwardly from each plow beam; a pinion positioned between and in mesh with both rack bars; a housing supporting said pinion; a rack frame having two parallel sets of internal teeth movably mounted in said housing, said sets of teeth being positioned on opposite sides of said pinion and being spaced so that only one set can mesh with said pinion at a time; yokes positioned adjacent said rack frame; rollers carried by said yokes supporting said rack frame thereon; means for raising and lowering said yokes to bring either desired set of teeth into mesh with said pinion; and means operable from said lifting levers for causing relative movement between said pinion and said rack frame.

10. A two-way plow attachment for a tractor, of the type having implement lifting levers actuated by said tractor, comprising: a pair of plow beams; a toothed rack bar extending upwardly from each plow beam; a pinion positioned between and in mesh with both rack bars; means for rotating said pinion in consequence of the movement of said lifting levers; and rollers positioned to maintain said rack bars in mesh with said pinion.

FRED P. NOFFSINGER.